United States Patent
Cho

(10) Patent No.: US 7,962,268 B2
(45) Date of Patent: Jun. 14, 2011

(54) METHOD AND APPARATUS FOR MANUAL-MODE SHIFTING USING VOICE COMMANDS IN AUTOMOBILE TRANSMISSIONS

(76) Inventor: Samuel Seungmin Cho, Fremont, CA (US)

( * ) Notice: Subject to any disclaimer, the term of this patent is extended or adjusted under 35 U.S.C. 154(b) by 558 days.

(21) Appl. No.: 12/124,021

(22) Filed: May 20, 2008

(65) Prior Publication Data

US 2008/0293540 A1 Nov. 27, 2008

Related U.S. Application Data

(60) Provisional application No. 60/924,573, filed on May 21, 2007.

(51) Int. Cl.
*F16H 59/08* (2006.01)
*B60W 10/00* (2006.01)
*G06F 17/00* (2006.01)
(52) U.S. Cl. ............... 701/51; 701/52; 477/78; 704/275
(58) Field of Classification Search .................... 701/51, 701/52; 477/78, 125; 704/275, 231
See application file for complete search history.

(56) References Cited

U.S. PATENT DOCUMENTS

| | | | | |
|---|---|---|---|---|
| 4,862,363 A | * | 8/1989 | Krisher et al. | 701/59 |
| 6,151,977 A | * | 11/2000 | Menig et al. | 74/336 R |
| 6,282,975 B1 | * | 9/2001 | Harrison et al. | 74/473.3 |
| 6,487,484 B1 | * | 11/2002 | Shober et al. | 701/51 |
| 6,514,174 B2 | * | 2/2003 | Iida et al. | 477/125 |
| 6,778,895 B1 | * | 8/2004 | Schwab et al. | 701/51 |
| 2002/0128762 A1 | * | 9/2002 | Noguchi et al. | 701/51 |
| 2006/0015234 A1 | * | 1/2006 | Luh | 701/51 |
| 2008/0216594 A1 | | 9/2008 | Strait et al. | |

* cited by examiner

*Primary Examiner* — Tan Q Nguyen
(74) *Attorney, Agent, or Firm* — Samuel S. Cho

(57) ABSTRACT

A shift-by-speech transmission system allows a driver or a motorcyclist to choose a desired gear by voice commands. Conventional sequential semi-manual shifting only allows the driver to shift one gear up or down from a current gear using a gearshift lever or a paddle shifter. The level of driver engagement in existing semi-manual shifters leaves much to be desired for many auto enthusiasts. An intuitive and engaging shift-by-speech technology disclosed in the present invention, called "VoiceShift", allows the driver or the motorcyclist to switch gears by voice commands. VoiceShift also allows the driver or the motorcyclist to skip gears to up-shift and down-shift as desired, as long as a desired gear does not result in mechanically-detrimental situations.

20 Claims, 6 Drawing Sheets

METHOD AND APPARATUS FOR MANUAL-MODE SHIFTING USING VOICE COMMANDS IN AUTOMOBILE TRANSMISSIONS

BACKGROUND

This invention generally relates to automobiles and/or motorcycles. In particular, the invention relates to a novel method and apparatus to provide driver-oriented and intuitive manual-mode transmission gearshifts in a variety of automobile transmissions.

Semi-manual transmissions, defined herein as including automatic, auto-clutch manual, or CVT transmissions with manual gear selection modes, are popular among modern automobiles today. Many auto manufacturers, including BMW, Mercedes-Benz, Toyota, Honda, Nissan, GM, and Hyundai provide semi-manual transmission gearboxes which enable drivers to choose a desired gear sequentially using a gearshift lever and/or a paddle shifter. Examples of semi-manual transmission gearboxes are "SportShift," "Tiptronic," "Sequential Manual Gearbox" (SMG), and "Direct Shift Gearbox" (DSG). SportShift and Tiptronic gearboxes are generally considered automatic transmissions with manual shift modes. SMG and DSG, on the other hand, are generally considered automated manual transmission gearboxes which provide computer-controlled clutching for rapid automated shifts.

The semi-manual transmission gearboxes generally operate sequentially. If a driver wants to double-downshift, the driver typically has to tap a gearshift lever twice or tap a paddle shifter twice to select a desired double-downshifted gear. Many auto enthusiasts believe that semi-manual transmissions reduce driving enjoyment by removing a driver's direct, mechanical linkage to an automobiles transmission system which is enabled by a physical manual clutch pedal and a manual "stick" shifter.

Although newer variants of semi-manual transmissions, such as SMG and DSG, significantly reduced the shifting delay caused by a driver's manual sequential gear selection compared to earlier semi-manual transmission gearboxes based on automatic transmissions, many drivers still complain that the lack of direct connection to the car achieved by a clutch pedal and a manual transmission box results in a less engaged and sometimes "less fun" driving experience. Furthermore, although the actual shifting of gears is provided electronically (shift-by-wire) on most semi-manual transmissions, a driver in the manual-shifting mode is still distracted by his/her requirement to operate a gearshift lever and/or a paddle shifter. Moreover, many critics of the existing semi-manual transmission setups also suggest that paddle shifters, which are often located behind a car's steering wheel, are difficult to operate on curvy roads when the steering wheel is turned substantially clockwise or counterclockwise from its straight-path position.

Therefore, a more intuitive and engaging approach to provide a semi-manual shift mode is desired for today's automobile drivers and motorcyclists.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

A shift-by-speech transmission system for a vehicle is configured to provide a manual gear selection indicated by a driver's voice command. The shift-by-speech transmission system comprises a microphone configured to pick up the driver's voice command, a voice recognition program configured to analyze the driver's voice command for a driver's particular gear selection, wherein the voice recognition program generates an output signal indicating the driver's particular gear selection if the driver's voice command is successfully understood, a shift-by-speech transmission control system operatively connected to or containing a manual-shifting mode control logic block operatively connected to a transmission gearbox, wherein the output signal of the voice recognition program to the shift-by-speech transmission control system enables a new gear engagement corresponding to the driver's particular gear selection for the transmission gearbox, and a transmission and/or engine protection logic block contained or operatively connected to the shift-by-speech transmission control system, wherein the transmission and/or engine protection logic block prevents a mechanically-detrimental manual gear selection if the driver's particular gear selection exceeds a desired rev-limit or causes potential harm to the vehicle.

Furthermore, a method to provide a voice-command manual gear selection for a semi-manual transmission system in a vehicle is disclosed. The method comprises steps of selecting a manual gearshift mode for the semi-manual transmission system, activating a shift-by-speech mode by pressing a shift-by-speech on/off button and/or depressing a gear selection voice command-activating pedal, capturing a driver's voice command indicating a particular gear number with a microphone operatively connected to a voice recognition program for the voice-command manual gear selection, comparing the driver's voice command to a plurality of known voice command profiles in the voice recognition program for the voice-command manual gear selection, and if the driver's voice command matches one of the plurality of known voice command profiles in the voice recognition program for the voice-command manual gear selection, then checking whether the particular gear number indicated by the driver's voice command does not result in over-revving or any other mechanical harm to the vehicle, and if the particular gear number indicated by the driver's gearshift voice command does not result in over-revving or any other mechanical harm to the vehicle, then shifting to the particular gear in the semi-manual transmission system.

Moreover, a shift-by-speech transmission system for a vehicle is configured to select a gear indicated by a driver's voice command. The shift-by-speech transmission system comprises a microphone configured to pick up the driver's voice command, an on/off switch configured to enable or disable a shift-by-speech manual-shifting mode, a gear selection voice command-activating pedal configured to provide a window of time to record the driver's voice command in the microphone when the gear selection voice command-activating pedal is depressed, a voice recognition program configured to analyze the driver's voice command for a driver's particular gear selection if the shift-by-speech manual-shifting mode is enabled, wherein the voice recognition program generates an output signal indicating the driver's particular gear selection if the driver's voice command is successfully understood, and a shift-by-speech transmission control system containing a manual-shifting mode control logic block operatively connected to a transmission gearbox, wherein the output signal of the voice recognition program to the shiftby-speech transmission control system enables choosing the driver's particular gear selection for the transmission gearbox.

DETAILED DESCRIPTION

Figure 1:
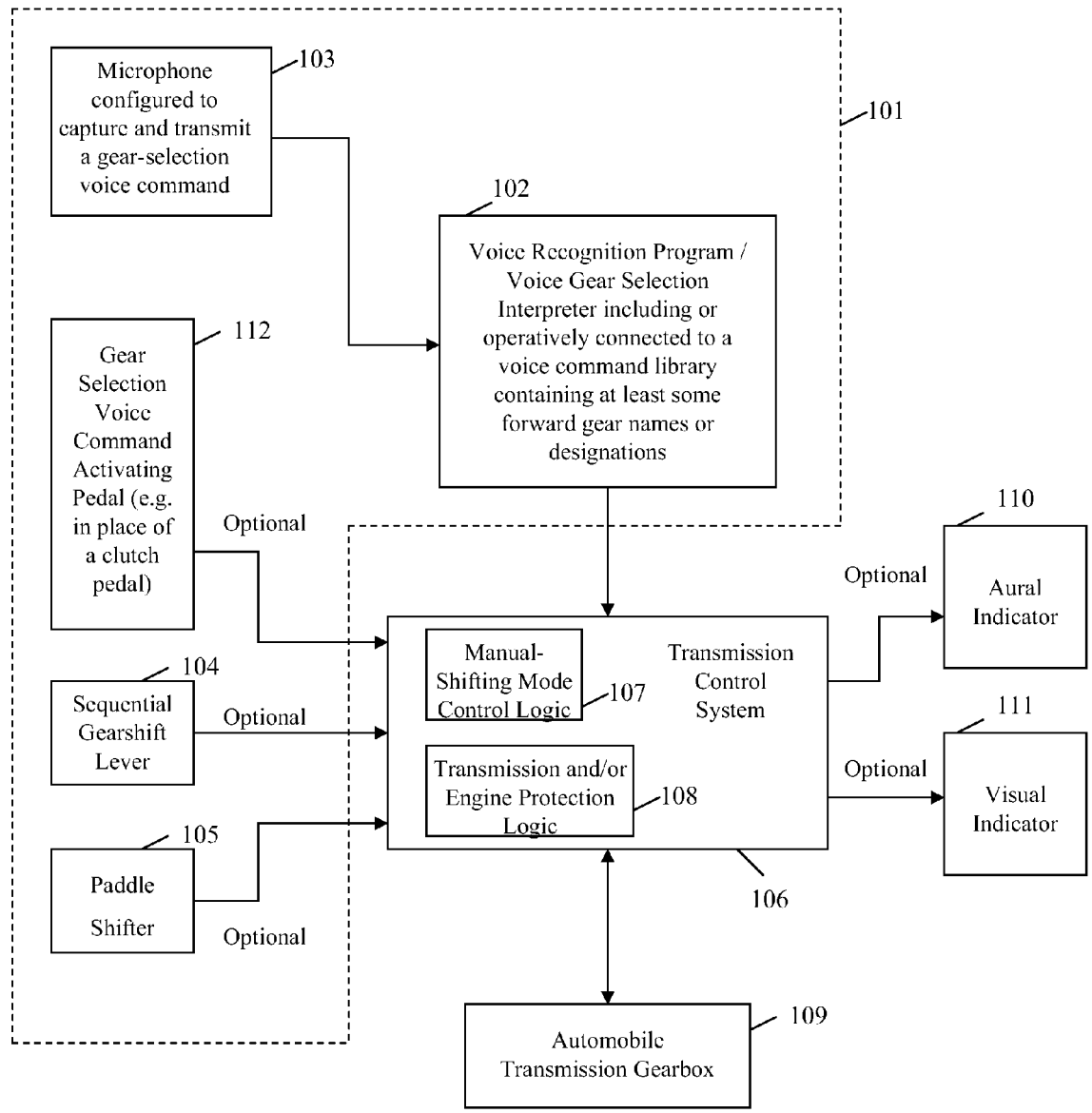
FIG. 1 shows a system-level block diagram in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate automotive transmission technology. In one embodiment of the invention, an intuitive shift-by-speech transmission system allows a driver to use voice commands to shift to a particular gear, typically when a manual-shifting mode is engaged for the automotive transmission. A term introduced in this patent literature, "VoiceShift," refers to a shift-by-speech transmission system embodied by the present invention for an automobile transmission capable of allowing a driver to use a voice command to shift to a particular gear.

In another embodiment of the invention, the VoiceShift technology is used with a manual-shift mode (e.g. the "M" gate with "+" and "−" signs) and an onboard VoiceShift on/off switch to provide a dedicated and safe VoiceShift mode for direct manual gearshifts, thereby uniquely accommodating a non-sequential manual gearshift command by the driver.

Yet in another embodiment of the invention, a gear selection voice command-activating pedal (i.e. in place of a clutch pedal in a manual transmission) is used in conjunction with an automatic, auto-clutch, or CVT transmission and the VoiceShift technology to provide a safe, dynamic, and engaging direct gear-shifting experience to a driver.

For modern automobile drivers, there are three main ways to achieve a connection between a car and a driver. The first is the car's steering wheel. The steering wheel takes a driver's input to change the direction of a car. The steering wheel also provides a feedback, generally known as "road feel" to the driver by emanating texture and condition of roads and tires. The second way to achieve the connection between the car and the driver is accelerator and brake pedals. The amount of pressure applied to accelerator and brake pedals directly impact vehicle dynamics. Like the car's steering wheel, the pedals also provide some feedback related to texture and condition of roads and tires.

The third connection between the car and the driver is achieved by transmission gear shifts. Many auto enthusiasts still choose a traditional clutch pedal and stick shifter setup over conventional automatic transmissions because they feel more mechanical connection to the car with more refined driver control of the vehicle. Several transmission manufacturers and automakers came up with semi-manual transmissions with manual shift modes. These semi-manual transmissions can generally operate in automatic-shift modes unless a driver wants a manual sequential shifting. For the purpose of term definitions in describing the present invention, three types of "semi-manual transmissions" are defined as follows. A first type of semi-manual transmissions is an automatic transmission with a torque converter that has a simulated manual gear shift mode (e.g. with an "M" transmission gate). These are commonly marketed as "Tiptronic", "SportShift", and "Steptronic" by a variety of auto manufacturers. A second type of semi-manual transmissions is an auto-clutch manual transmission capable of sequential manual gearshifts in a manual-shift mode (e.g. in "M" transmission gate) and simulated automatic shifts in an automatic-shift mode (e.g. in "D" transmission gate). These are commonly marketed as Sequential Manual Gearbox (SMG) and Direct Shift Gearbox (DSG). The auto-clutch manual transmissions generally provide faster gear shifts relative to the automatic transmissions with torque converters. A third type of semi-manual transmissions is a continuously variable transmission (CVT) with simulated gears. In a manual-shifting mode, the simulated gears for the CVT transmission can be selected sequentially as desired by a driver. In the United States, the CVT with simulated gears and manual shift modes are sometimes marketed as "Multitronic" transmission.

The existing semi-manual automatic transmissions are generally operated by a "tappable" gearshift lever or a paddle shifter attached to a car's steering wheel mechanism. However, many drivers feel that these semi-manual transmissions with manual sequential gearshift levers and/or paddle shifters are somewhat unnatural and remove the driver excessively from a direct "man-to-machine" engagement achieved by a clutch pedal and a stick shift.

This invention discloses a shift-by-speech transmission system, defined herein as "VoiceShift," which enables a driver to choose his/her desired gear by saying a particular gear (e.g. "one", "two", "three", "four", "five", or "six") to a microphone operatively connected to a voice recognition program. The present invention (i.e. the VoiceShift technology) uniquely supports non-sequential skip-shifts (e.g. double, triple, or even quadruple downshifts or upshifts) in the manual shifting mode for semi-manual transmissions. Enabling non-sequential skip-shifts with an intuitive user interface using voice commands is a novel solution to achieve a similar level of a driver's sense of freedom and satisfaction of choosing any gear (i.e. non-sequentially if the driver desires to skip-shift) in a manual transmission with an H-type shift pattern. The VoiceShift technology also achieves the driver's sense of freedom and satisfaction of either sequentially or non-sequentially choosing any gear in a manual-shifting mode while minimizing driver distraction during execution of manual shifts. The present invention also incorporates a novel transmission and/or engine protection logic specifically for the VoiceShift system to manage what could be mechanically-damaging gearshift voice commands to a VoiceShift-equipped vehicle.

There have been a few attempts in the automotive industry to use speech recognition technology for automotive transmissions, even though those attempts are substantially different from the present invention and do not anticipate or suggest the present invention. In patent literatures, one approach using speech recognition technology is disclosed by James A. Krisher and Barry R. Lloyd of Dana Corporation in U.S. Pat. No. 4,862,363, titled "Voice Actuated Two Speed Axle" filed in Dec. 16, 1987 (herein referred as "Krisher et al. '363"). Krisher et al. '363 discloses an voice-actuated apparatus capable of sequentially shifting gears up or down by issuing voice commands "Shift Up" or "Shift Down", when the voice-actuated apparatus issues aural alerts such as "Ready to Shift Up" or "Ready to Shift Down." The voice-actuated apparatus disclosed in Krisher et al. '363 is limited to vehicles with sequentially-operating transmissions, which only takes sequential gearshift voice commands such as "Shift Up" or "Shift Down" from the current gear. It is important to note that Krisher et al. '363 does not anticipate or suggest non-sequential direct gearshifts or skip-shifts using voice commands, which are key elements of the present invention. Furthermore, the voice-actuated apparatus disclosed in Krisher et al. '363 does not anticipate or suggest using voice command gearshifting specifically for a manual-shifting mode (e.g. "M" transmission gate) of an automobile transmission which is also capable of automatically shifting gears in a normal mode of operation without any driver's voice command feedback (e.g. "D" transmission gate).

Another approach using speech recognition technology is disclosed by Manfred Schwab and Ludger Ronge of ZF Friedrichshafen AG in U.S. Pat. No. 6,778,895, titled "Control of an Automatic or Automated Gearbox Using Voice Command" (herein referred as "Schwab et al. '895"), with a foreign priority date of Sep. 29, 1999. Schwab et al. '895 is substantially different from the present invention and does not anticipate or suggest the present invention for several reasons.

First, the mechanism of action disclosed in Schwab et al. '895 shows a vehicle transmission capable of receiving a voice command to form a transmission control signal, which has to directly "override" a shift signal already generated by the transmission control to form "a new shift signal" for a transmission shift (Claim 1, Claim 11). Because the intended purpose of Schwab et al. '895 is allowing a driver to issue a voice command to interrupt and "override" an automobile transmission's normal course operation due to traffic situation, road topography (e.g. uphill or downhill), and other road conditions, (Lines 3-4, 10-16, 23-30 in Column 2 of Schwab et al. '895), the voice command is used as an interrupt measure to alter the transmission's normal course of operation. As suggested by claims 1 and 11 in Schwab et al. '895 for "overriding a shift signal" already generated by the transmission control with a voice command, Schwab et al. '895 discloses a way to use a voice command as an interrupt measure in a transmission's normal operating mode (e.g. for example, in "D" transmission gate).

The inventors for Schwab et al. '895 envisioned and disclosed applying voice commands in a regular automatic transmission "Drive" or "D" mode (e.g. "D" transmission gate), so that a normal automatic transmission shift signal in D-mode generated by the transmission control system can be interrupted and overridden by the driver's voice command, when the driver finds interrupting the regular automatic shifting pattern of the gears appropriate.

In contrast, the present invention uses voice commands for shifting gears in a separate manual gearshift mode (e.g. in "M" transmission gate for "shift-for-yourself mode"), as opposed to overriding a shift signal in an automated drive mode (e.g. transmission in "D" gate) which is what Schwab et al. '895 discloses.

In a "shift-for-yourself" or manual-shifting mode (e.g. in "M" transmission gate), as embodied by the present invention in conjunction with voice commands for gearshifts, a driver's voice command for a gearshift does not have to "override" a shift signal of the transmission control, because the transmission control is not operating under an automatic "drive" mode and therefore a currently-selected gear is maintained by a manual-shifting mode control logic. Therefore, the Voice-Shift technology disclosed in the present invention, which is intended to be used specifically and uniquely in a manual-shifting mode (e.g. in "M" transmission gate) is not anticipated or suggested by Schwab et al. '895.

Furthermore, a key novelty of the present invention is an intuitive driver interface which allows double, triple, or even quadruple downshifts or upshifts to simulate a driver's true sense of freedom and satisfaction of using an H-type shift pattern manual transmissions. Non-sequential and skip gearshifting capability by voice command in a dedicated manual shift-mode is a key novelty of the present invention not anticipated or obviated by Schwab et al. '895 or Krisher et al. '363.

In one preferred embodiment (i.e. "best mode") of the present invention, if the driver's spoken gear selection is recognized by the voice recognition program as one of the transmission gears, the VoiceShift system first checks whether the spoken gear selection does not harm the vehicle's engine and transmissions (e.g. over-revving caused by an excessive skip-gear downshift). If the spoken gear selection recognized by the voice recognition system does not harm the vehicle's engine and transmissions, the VoiceShift system triggers a gear selection command to a transmission control system, which in turn causes an electromechanical or hydraulic action to execute a desired gearshift. If rev-matching or any other preparation by engine and/or transmission control system is desired, the engine and/or transmission control system(s) can pre-compute and prepare for engagement of the spoken gear selection before an actual gear shift corresponding to the spoken gear selection is executed by the transmission control system.

It is preferred that the VoiceShift system makes the gear selection with minimal time delay to maximize driver satisfaction and engagement. For instance, the processing time between a driver's spoken gear selection to the actual gear shift can be less than half a second. If the VoiceShift system is implemented with a dedicated voice library containing not much more than just a few words (e.g. names of each forward gear for the automobile's transmission), which are separate from a common voice library for temperature, radio, and telephone controls, the voice library search time for a spoken gear selection can be minimized and the matching rate between the spoken gear selection and a corresponding voice command stored in the VoiceShift system can be improved. Therefore, a preferred embodiment of the present invention uses a dedicated voice library only containing gearshift voice commands for the VoiceShift system, and vehicle voice commands unrelated to the VoiceShift system are kept in another voice library.

FIG. 1 shows a system-level block diagram according to one embodiment of the invention (i.e. a shift-by-speech transmission system (100), also interchangeably called in this patent literature as the "VoiceShift system"). In this particular configuration, a transmission control system (106) contains a manual-shifting mode control logic block (107). The manual-shifting mode control logic block (107) is configured to provide a manual-shift mode to the driver, including non-sequential skip-shifts and conventional sequential shifts. In one embodiment of the invention, the manual-shifting mode control logic block (107) is operatively connected to a transmission and/or engine protection logic block (108), which prevents actuation of any mechanically-damaging gear changes if such a mechanically-damaging gear change is requested by the driver via VoiceShift voice commands.

One example of a mechanically-damaging gear change is a driver's voice command to quadruple downshift (i.e. Four-gear skip-downshift) from the fifth gear to the first gear while a VoiceShift-equipped vehicle is cruising at 65 mils per hour. In this scenario, the transmission and/or engine protection logic block (108), which incorporates a rev-limit logic, prevents mechanically-damaging over-revving of the vehicle's engine by denying the driver's voice command to quadruple-downshift to the first gear. An onboard microprocessor contained in the shift-by-speech transmission system (100) or operatively connected to the shift-by-speech transmission system (100) can calculate an acceptable threshold limit for a safe downshift to a lower gear. If selecting a lower gear is calculated to cause a potentially damaging situation to an engine and transmission system (e.g. overly-aggressive skip-downshift or skip-upshift command by the driver), the transmission and/or engine protection logic block (108) denies the driver's voice command to shift to a particular gear. In another embodiment of the invention, the transmission and/or engine protection logic block (108) is contained in the manual-shifting mode control logic block (107) and achieves necessary protection to the engine and the transmission system in the manual-shifting mode.

Continuing with FIG. 1, the transmission control system (106) is operatively connected to an automobile transmission gearbox (109). VoiceShift technology disclosed in the present invention can be applied to a variety of automobile transmission systems, including automatic transmissions, auto-clutch transmissions, and CVT's as long as the transmissions provide actual or simulated gears and gear ratios. Preferably, an automobile transmission using the VoiceShift technology has a separate manual-shifting mode (e.g. transmission gate "M") for conventional sequential manual shifts and novel non-sequential manual skip-shifts as embodied by the present invention. An automobile transmission with an automated shifting mode (e.g. transmission gate "D") and a separate manual-shifting mode (e.g. transmission gate "M") is defined herein as a semi-manual transmission. In one embodiment of the invention, an output signal or a plurality of output signals from the transmission control system (106) triggers an electromechanical or hydraulic gear-shifting in the transmission gearbox (109). The transmission control system (106) is also operatively connected to a voice recognition program (102). The voice recognition program (102) analyzes a driver's voice command input to a microphone (103). In one embodiment of the invention, the voice recognition program contains a known set of voice command profiles for each gear. For example, when the microphone (103) picks up a driver's voice command, "two," the voice recognition software attempts to match the driver's voice command to a known set of voice command profiles for gear shifting. In one embodiment of the invention, if the vehicle is in a VoiceShift-enabled manual-shifting mode, the driver's voice command, "two," matches with a known gearshift command, "Shift to Second Gear" in the voice recognition program (102). This successful voice command match in the voice recognition program (102) sends a signal to the manual-shifting mode control logic block (107) to initiate an electromechanical or hydraulic shift to the second gear in the automobile transmission gearbox (109). If the transmission and/or engine protection logic block (108) determines that shifting to the second gear does not potentially harm the engine and transmission system, the transmission control system (106) sends a signal to the transmission gearbox (109) to shift to the second gear. In one preferred mode of embodiment, the time delay between a driver's voice command for a gear shift to an actual electromechanical or hydraulic engagement of a new gear is minimal, often less than one second.

Continuing with FIG. 1, the shift-by-speech transmission system (100) optionally also has conventional means to shift gears in a manual-shifting mode. One conventional way to shift gears is a sequential gearshift lever (104), which can be tapped sideways or up-and-down for up-shifts or down-shifts. Another conventional way to shift gears is a paddle shifter or a plurality of paddle shifters (105), which can be pushed, pulled, or pressed to initiate up-shifts or down-shifts. In one embodiment of the invention, the shift-by-speech transmission system (100) for taking driver's gear-shift commands by voice can be activated in two-steps. A first step can be sliding a VoiceShift-enabled semi-manual transmission to a manual-shifting mode, commonly called the "M-mode". In the M-mode, a vehicle may also take input from the paddle shifter (105) or the sequential gearshift lever (104) for manual gear shifting. A second step is pressing a separate "voice-shift enable" button, at which point the shift-by-speech transmission system (100) can actively listen to driver's voice commands for manual gear shifting in the manual-shifting mode. Although this invention is not limited to such two-step processes to activate the shift-by-speech transmission system (100), there are some advantages to such two-step processes.

One advantage of the two-step processes to activate the VoiceShift mode is minimizing the driver's user-interface error. It could be an annoyance to the driver if the shift-by-speech transmission system (100) is accidentally active simply because the transmission shifter is accidentally set in a wrong transmission gate. (i.e. transmission shifter accidentally sliding into the "M-mode" gate). Furthermore, the shift-by-speech transmission system (100) may not accurately pick up a driver's voice command for gear-shifting if a car audio is active. In one embodiment of the invention, a separate button to enable the shift-by-speech transmission system (100) allows the car audio to "fade-out" quietly while car speakers announce "VoiceShift system on". Disabling the shift-by-speech transmission system (100) by pressing the button again can trigger the car speakers to announce "VoiceShift system off" and fade-in music that was previously faded-out by enabling the shift-by-speech transmission system (100). While these two-step processes do not limit the scope, Claims, or extent of the invention, it is hereby noted that the two-step processes is a preferred mode (i.e. best mode) for the invention.

In one embodiment of the invention, the shift-by-speech transmission system (100) is configured to operate with a gear selection voice command-activating pedal (112), which can be placed as an electronically-activated pedal next to a brake pedal (e.g. in place of where a clutch pedal is in a manual transmission vehicle). In one example of this embodiment, when the gear selection voice command-activating pedal (112) is depressed by a driver's left foot, the shift-by-speech transmission system (100) opens a window of time to take a driver's manual gear selection voice command for a rapid and safe processing of a desired gearshift. If the gear selection voice command-activating pedal (112) is no longer depressed by the driver's left foot, the shift-by-speech transmission system (100) disables input from the microphone (103) until the voice command-activating pedal (112) is depressed again. This vehicle-to-driver interface using the gear selection voice command-activating pedal (112) is very similar to an interaction between a driver and a clutch pedal in a manual transmission vehicle, which is significantly more intuitive and exciting than conventional sequential manual gear selection interfaces for semi-manual transmissions. In one preferred embodiment of the present invention, the shift-by-speech transmission system (100) has a front-end interface (101) comprising the microphone (103), the voice recognition program (102), the gear selection voice command-activating pedal (112), the sequential gearshift lever (104), and the paddle shifter (105).

Continuing with FIG. 1, the shift-by-speech transmission system (100) can optionally have an aural indicator (110) and a visual indicator (111) operatively connected to the transmission control system (106). In one embodiment of the invention, the aural indicator (110) is operatively connected to a vehicle's audio speakers and the visual indicator (111) is operatively connected to a vehicle's instrument panel. In another embodiment of the invention, the aural indicator (110) has its own speaker.

In one example, the aural indicator (110) is configured to generate a confirmatory sound (e.g. one short "beep") if a successful voice-command gear shifting occurs in a manual-shifting mode. In the same example, the aural indicator (110) is also configured to generate a denial-of-shift sound (e.g. one "beep-beep") if the voice command is not understood or a gear-shifting cannot occur for any other reasons (e.g. over-revving if a driver's desired gear were to be engaged).

Figure 2:
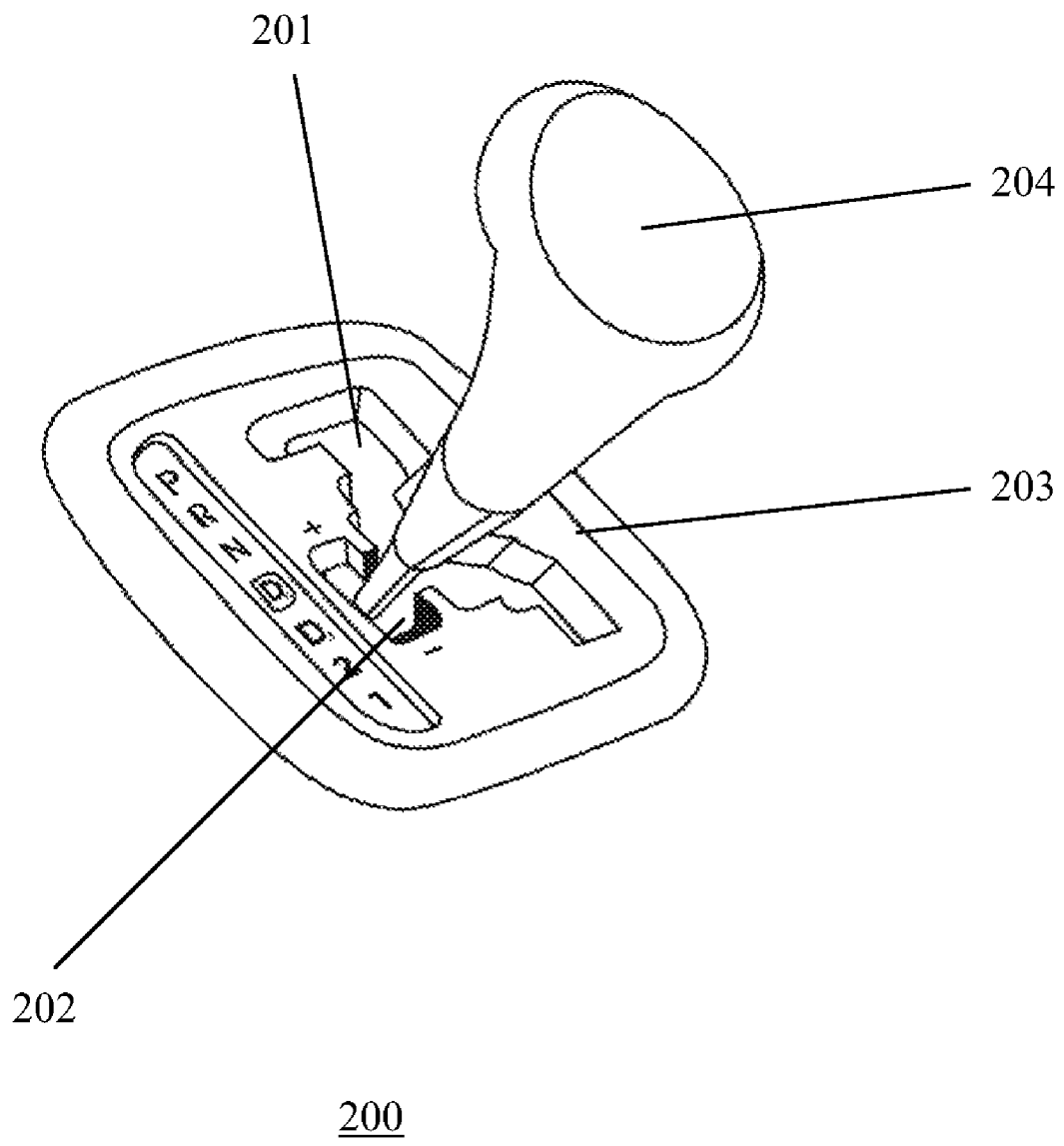
FIG. 2 shows a semi-manual gearshift lever in accordance with an embodiment of the invention.

FIG. 2 is a transmission gate configuration (201) in accordance with one embodiment (200) of the invention. In general, this transmission gate configuration (201) is a standard setup in many semi-manual transmission vehicles, other than for geometrical differences (i.e. manual-mode shifting gate, or "M"-gate could be on the left, right, or bottom of other transmission gates). Typically, if a transmission gearshift lever (204) is in the M-gate (202) of a semi-manual transmission interface (203), the vehicle's transmission is in a manual-shifting mode. In this particular configuration as shown in FIG. 2, tapping the transmission gearshift lever (204) upward to "+" direction results in a sequential up-shift. Tapping the transmission gearshift lever (204) downward to "−" direction results in a sequential down-shift. It should be noted that one major advantage of the VoiceShift system, which can be implemented either independently or in conjunction with the existing manual-shifting setup as shown in FIG. 2, is its freedom to double down-shift or even triple or quadruple-downshift, if the transmission system's rev-limiter or engine/transmission protection logic determines that such down-shifts are not potentially detrimental to the engine and/or transmission system. In one embodiment of the invention, the rev-limiter logic is typically incorporated in the transmission and/or engine protection logic block (108) of FIG. 1.

Likewise, the VoiceShift system also enables a double, triple, or quadruple up-shifts if the transmission system determines that such skip shifts are not damaging to the engine and transmission system. The driver's freedom and flexibility gained by the VoiceShift system is significant. Instead of being confined by sequential manual shifts, the driver is able to skip-shift as he or she is able to do in a traditional manual transmission system with a clutch pedal. Furthermore, the VoiceShift system enables a safer and more engaged driving experience by reducing driver distraction caused by somewhat unnatural motion of tapping transmission shifters or paddle shifters.

Figure 3:
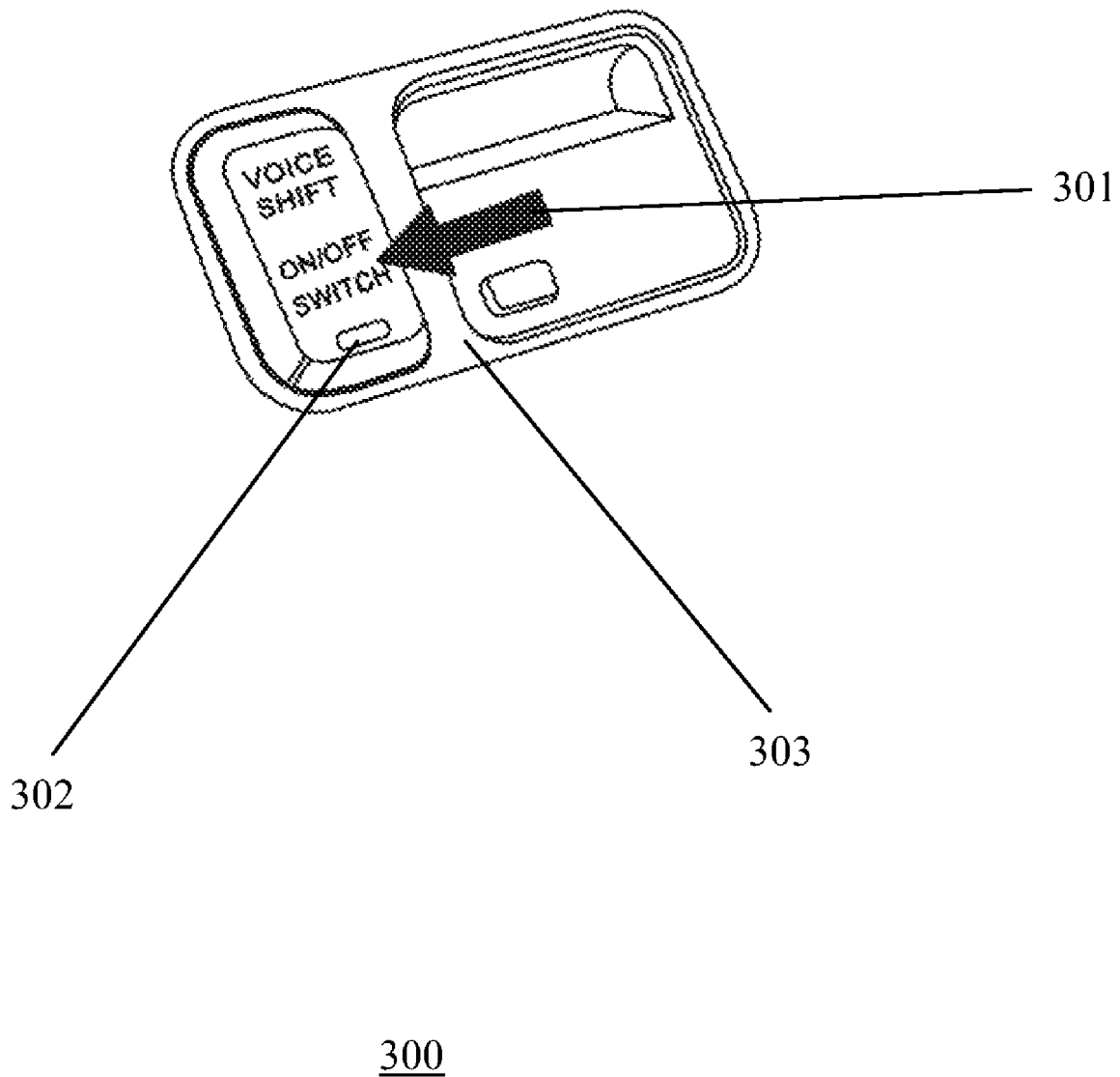
FIG. 3 shows a VoiceShift on/off switch on a dashboard, a transmission box, or a steering wheel in accordance with an embodiment of the invention.

FIG. 3 is a VoiceShift on/off switch (301) in accordance with one VoiceShift switch configuration (300). In FIG. 3, the VoiceShift on/off switch (301) is pointed by a thick black arrow for illustration purposes. The VoiceShift on/off switch (301) has a light indicator (302) to inform the driver whether the VoiceShift system is on or off. The VoiceShift switch configuration (300) can be used as part of the two step processes previously described for FIG. 1 for activating the VoiceShift system. The VoiceShift on/off switch (301) could be located on a car dashboard (303), a center stack, a steering wheel, or any other desired locations in a car equipped with the VoiceShift system. It is noted that VoiceShift on/off switch (301) is merely optional to the VoiceShift system and does not limit scope or claims of the invention.

Figure 4:
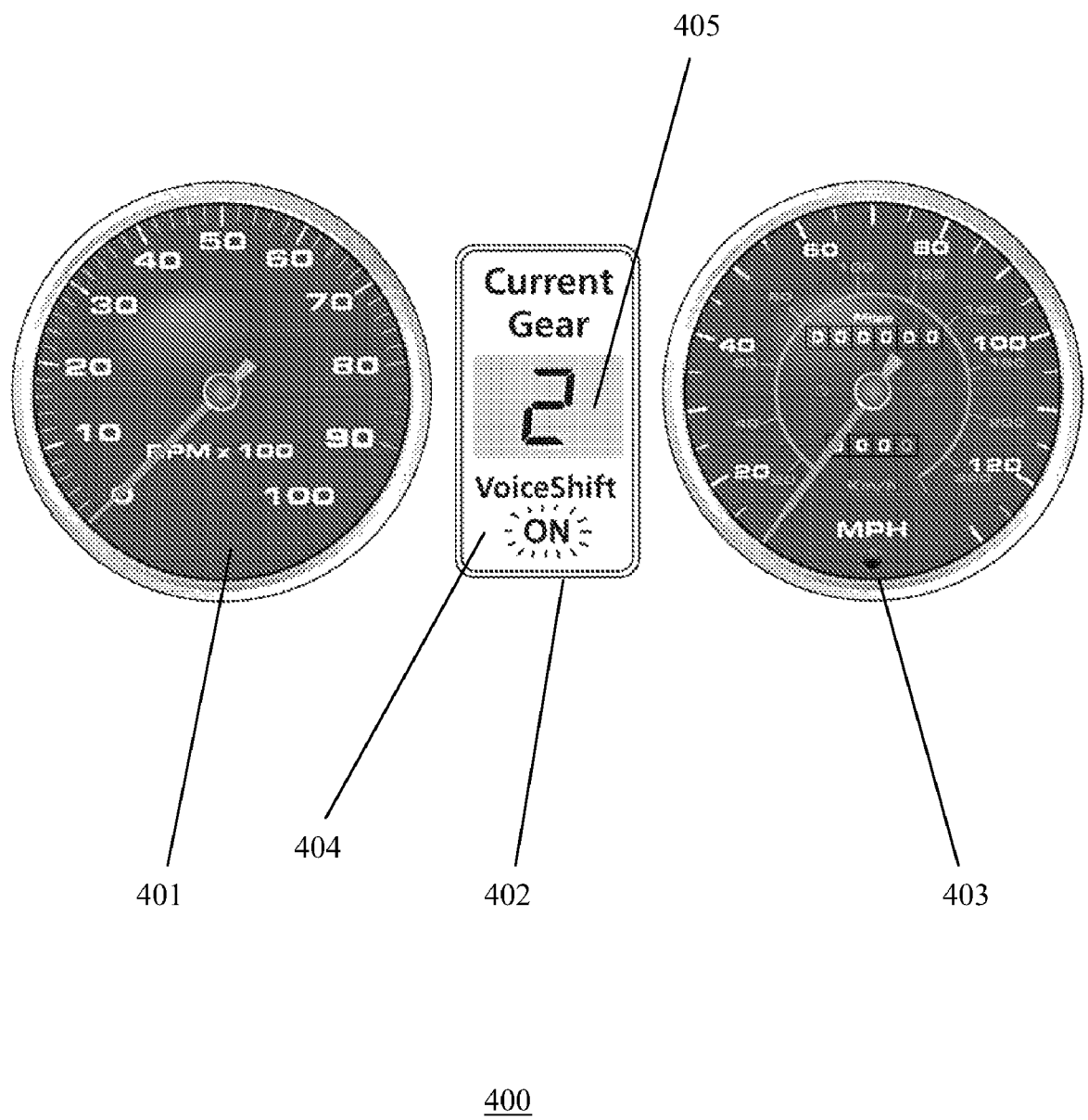
FIG. 4 shows a VoiceShift-enabled instrument panel with a visual gear selection indicator in accordance with an embodiment of the invention.

FIG. 4 shows a car dashboard (400) with a VoiceShift system visual indicator (402) in accordance with an embodiment of the invention. In one embodiment of the invention, if the VoiceShift System is enabled, "VoiceShift On" message (404) appears in the VoiceShift system visual indicator (402). The VoiceShift system visual indicator (402) shows a current gear selection (405) (e.g. Second-gear indicated as "2") and whether the VoiceShift system is "on". The VoiceShift system indicator (402) can be part of an LCD screen or a separate lighted indicator, which is typically located in the car dashboard (400). The car dashboard also typically contains a tachometer (401) and a speedometer (403).

Figure 5:
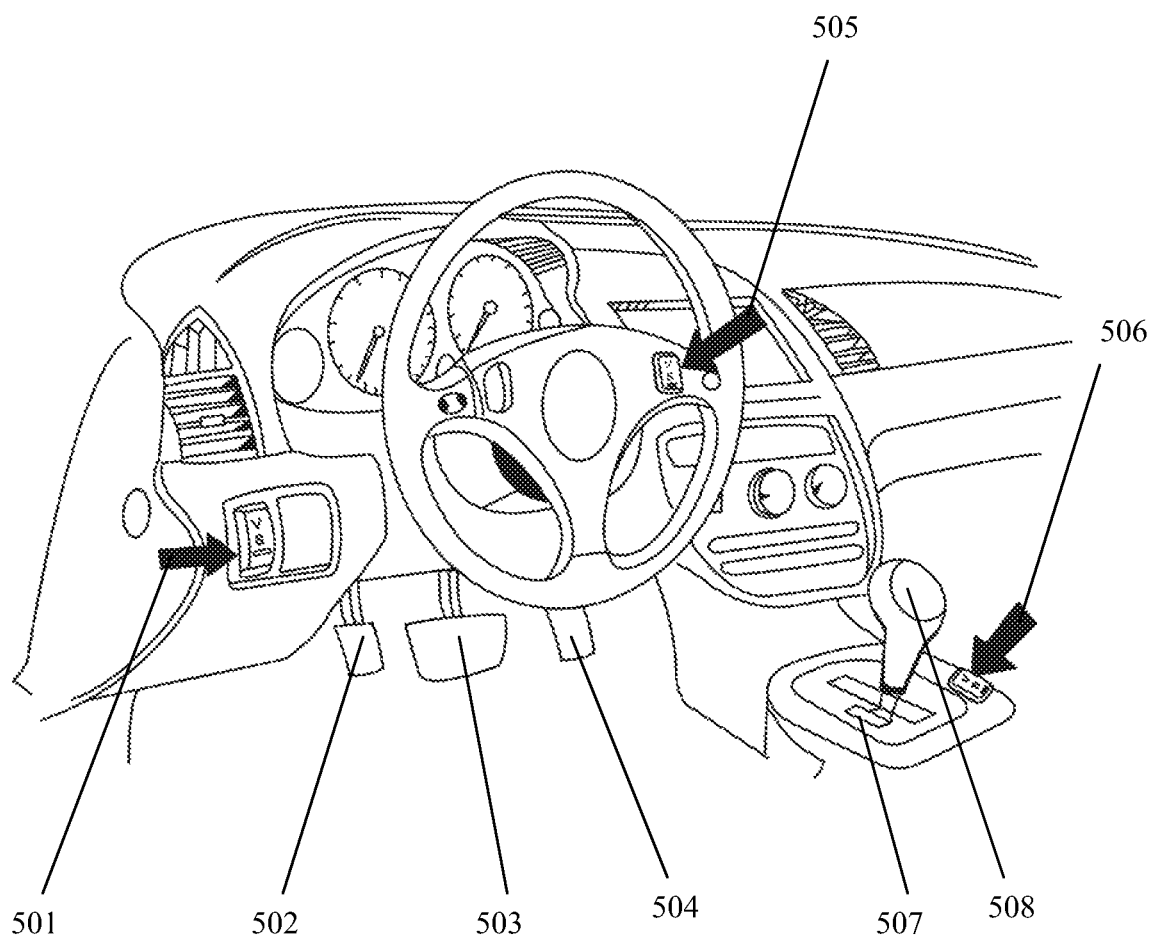
FIG. 5 shows a VoiceShift-capable operating environment with a dedicated VoiceShift activation pedal and one or more VoiceShift-enabling switches in accordance with an embodiment of the invention.

FIG. 5 shows a VoiceShift-capable operating environment (500) with a dedicated VoiceShift activation pedal (502), a gearshift lever (508), a manual-shifting mode gate (507), and one or more VoiceShift on/off switches (501, 505, 506) pointed by thick black arrows for the purpose of illustration, in accordance with an embodiment of the invention. In this particular example as shown in FIG. 5, the dedicated Voice-Shift activation pedal (502) is one type of the "gear selection voice command-activating pedal" (112) previously described in FIG. 1. In a preferred embodiment of the invention, the dedicated VoiceShift activation pedal (502) is next to a brake pedal (503) and an accelerator pedal (504).

In one embodiment of the invention, the VoiceShift-capable operating environment (500) is equipped with the dedicated VoiceShift activation pedal (502) which can be placed as an electronically-activated pedal next to a brake pedal (e.g. in place of where a clutch pedal is in a manual transmission vehicle). An electronically-activated pedal is defined as a pedal activated or deactivated by depression or release of the pedal, typically acting as an electrical on/off switch. Although an electronically-activated pedal is a preferred embodiment of the invention for the dedicated VoiceShift activation pedal (502), hydraulic, mechanical, or other types of pedals can be used for the dedicated VoiceShift activation pedal (502).

Continuing with FIG. 5, in one embodiment of the VoiceShift-capable operating environment (500), when a VoiceShift system is switched to an "on" mode and the dedicated VoiceShift activation pedal (502) is depressed by a driver's left foot, the VoiceShift system operatively connected to the dedicated VoiceShift activation pedal (502) opens a window of time for a microphone to take a driver's manual gear selection voice command for a rapid and safe processing of the driver's manual gear selection voice command. If the dedicated VoiceShift activation pedal (502) is no longer depressed by the driver's left foot, the VoiceShift system disables input from the microphone until the dedicated VoiceShift activation pedal (502) is depressed again. This vehicle-to-driver interface using the dedicated VoiceShift activation pedal (502) simulates the interaction between a driver and a clutch pedal in a manual transmission vehicle. Therefore, the present invention, as shown by the VoiceShift-capable operating environment (500) of FIG. 5, is significantly more intuitive and exciting than conventional sequential manual gear selection interfaces.

The implementation of VoiceShift on/off switches (501, 505, 506) in FIG. 5 is optional. Only one VoiceShift on/off switch or any combination of these VoiceShift on/off switches (501, 505, 506) may be implemented in the VoiceShift-capable operating environment (500) according to a preference of an automotive interior design team. In one preferred embodiment of the present invention, the dedicated VoiceShift activation pedal (502) is functionally active only when the VoiceShift system is switched to an "on" mode by at least one of the VoiceShift on/off switches (501, 505, 506). Therefore, in the same preferred embodiment of the present invention, if the VoiceShift system is in an "off" mode, the dedicated VoiceShift activation pedal (502) is also functionally disabled, whether the VoiceShift activation pedal (502) is depressed or released by the driver. This preferred embodiment with one or more VoiceShift on/off switches (501, 505, 506) and the dedicated VoiceShift activation pedal (502), which operates only when the VoiceShift is in the "on" mode, provides an additional level of safety against accidental operation of the driver's manual gear selection voice command.

Furthermore, even more level of safety may be added to prevent accidental operation of the driver's manual gear selection voice command by requiring the driver to place the gearshift lever (508) to the manual-shifting mode gate (507) (i.e. "M" transmission gate) from an automatic drive mode (i.e. "D" transmission gate) to activate the VoiceShift system. By providing a three-level of protection from an accidental operation of the driver's manual gear selection voice command, (i.e. a position of the gearshift lever to be placed in the "M" gate, a VoiceShift on/off switch to be switched "on", and a VoiceShift activation pedal (502) to be depressed to activate a microphone for voice command input to the VoiceShift system), the driver's chance of accidental operation of VoiceShift is minimized.

Continuing with FIG. 5, when the VoiceShift is switched to the "on" mode by one of the VoiceShift on/off switches (501, 505, 506) and/or when the VoiceShift activation pedal (502) is depressed by the driver's left foot, a vehicle's audio system can be automatically muted for accurate reception of the driver's manual gear selection voice command. In one embodiment of the invention, each VoiceShift on/off switch (501, 505, 506) in FIG. 5 is functionally similar to the VoiceShift on/off switch (301) of FIG. 3.

Figure 6:
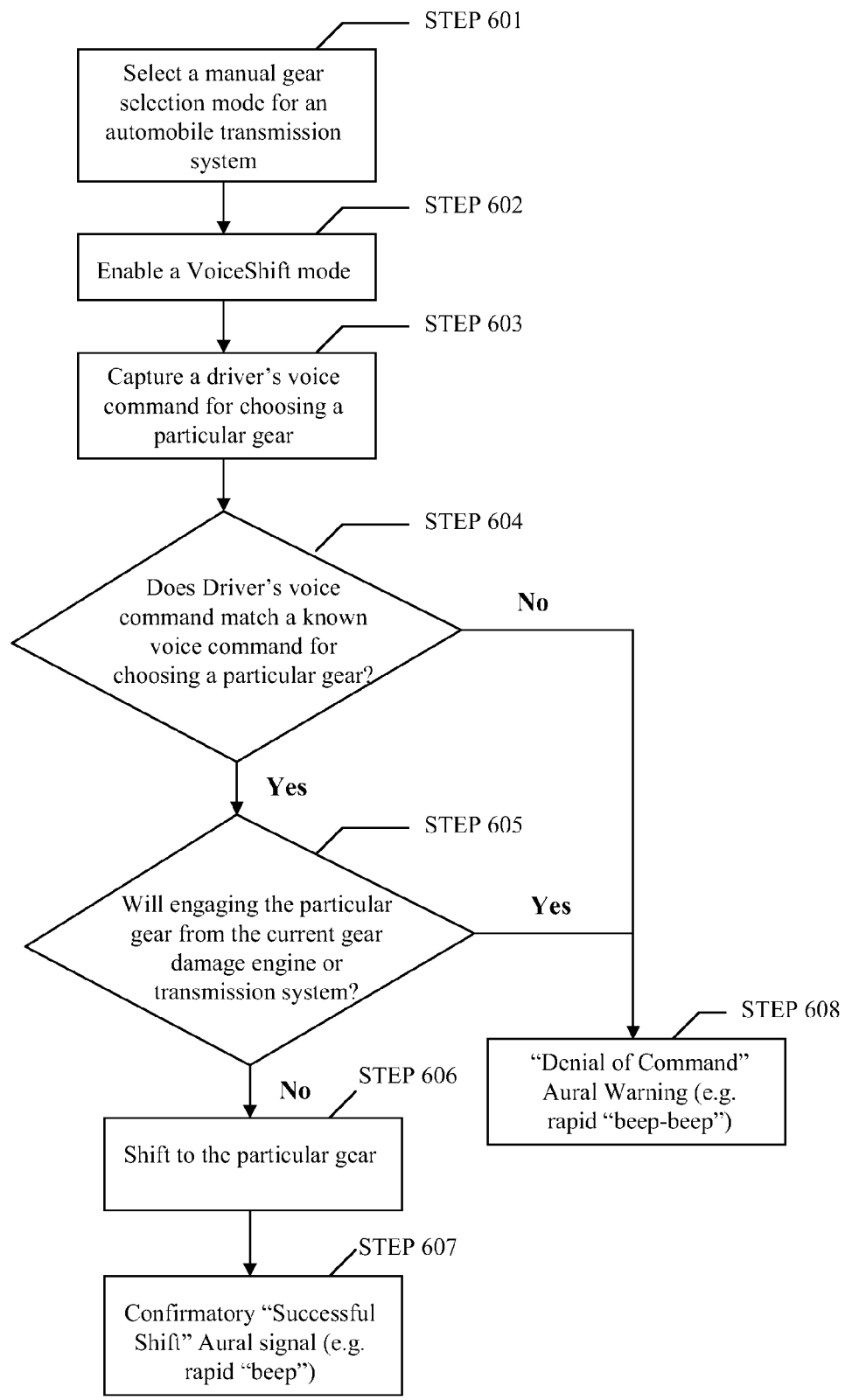
FIG. 6 shows a flowchart of VoiceShift in accordance with an embodiment of the invention.

FIG. 6 shows a flowchart for the VoiceShift system in accordance with one embodiment of the invention. In STEP 601, a driver activates a manual gear selection mode (e.g. "M" gate or "M-mode" from transmission gates) for a semi-manual transmission of a vehicle. In one embodiment of the invention, the manual gear selection mode enables a "tappable" gear shift lever or paddle shifters for manual gear selection. The engagement into the manual gear selection mode can also serve as an initiating step for using the VoiceShift system. In STEP 602, a VoiceShift mode is enabled, or switched to an "on" mode, after the manual gear selection mode for the semi-manual transmission is activated from STEP 601. In one embodiment, STEP 601 and STEP 602 can be combined as one procedure. It could be as simple as putting the gearshift lever in the "M" gate. In another embodiment, STEP 602 is one or more steps. For example, the VoiceShift mode can be enabled by pushing a separate button on a center stack or a dashboard. The advantages of such two-step processes are previously described for FIG. 1.

Continuing with FIG. 6, in STEP 603, a microphone operatively connected to the VoiceShift system captures a driver's voice command for choosing a particular gear. As previously described for FIG. 5, STEP 603 can optionally require the driver to depress a VoiceShift-activating pedal (502) to activate the microphone temporarily to record the driver's voice command for choosing the particular gear. The use of the VoiceShift-activating pedal (502) is an intuitive and safe measure to simulate freedom and excitement of driving a manual stick-shift vehicle.

In STEP 604, a voice recognition program for the VoiceShift system determines whether the driver's voice command matches a known voice command for choosing the particular gear. If the voice recognition program does not understand the driver's voice command or does not find an appropriate match from a library of known voice commands, the VoiceShift system sends a denial-of-command aural warning, which could be as simple as a "beep-beep", as shown in STEP 608. If the driver's voice command matches a known voice command for choosing the particular gear, then in STEP 605, a rev-limit logic and/or an engine/transmission protection logic calculates and determines whether engaging the particular gear desired by the driver will result in over-revving or any other potential harm to the engine/transmission system.

If the rev-limit logic and/or an engine/transmission protection logic determines that engaging the particular gear does not cause any harm to the engine/transmission system in STEP 605, then in STEP 606, a VoiceShift-enabled transmission control system triggers a gearshift to the particular gear, as instructed by the driver using a voice command. Then, in STEP 607, the VoiceShift system generates a confirmatory aural signal indicating a gearshift, which could be as simple as one short "beep".

On the other hand, if the rev-limit logic or an engine/transmission protection logic determines that engaging the particular gear is harmful to the engine/transmission system in STEP 605, then in STEP 608, the VoiceShift system sends a denial-of-command aural warning, which could be as simple as a "beep-beep".

As shown in aforementioned figures and related descriptions, the present invention discloses an intuitive shift-by-speech technology (i.e. VoiceShift system) which allows a driver to use voice commands to shift to a particular gear, typically when a manual-shifting mode is engaged for the automotive transmission. A key benefit of the present invention is allowing both conventional sequential manual-mode gearshifts as well as novel, non-sequential manual-mode gear gearshifts using a manual gear selection voice command.

Another advantage of the present invention is an intuitive driver interface, as shown in FIGS. 1~5, which uniquely allows double, triple, or even quadruple downshifts or upshifts (i.e. skip-gearshifts) to simulate a driver's true sense of freedom and satisfaction of using an H-type shift pattern manual transmissions. Non-sequential and skip-gearshift capability by voice command in a dedicated manual shift-mode (e.g. "M" transmission gate) is a key novelty of the present invention.

As shown in one embodiment of the present invention, the VoiceShift technology can be used with a manual-mode transmission gate for a gearshift lever (e.g. the "M" gate with "+" and "−" signs) and an onboard VoiceShift on/off switch to provide a dedicated and safe VoiceShift mode for direct manual gearshifts, thereby uniquely accommodating non-sequential gearshift command by the driver.

As shown in one embodiment of the present invention, a gear selection voice command-activating pedal (i.e. in place of a clutch pedal in a manual transmission) may also be used in conjunction with the VoiceShift technology and a semi-manual transmission to provide a safe, dynamic, and engaging direct gear-shifting experience to a driver. The concept of using the gear selection voice command-activating pedal in a semi-manual transmission for a vehicle is also a unique and novel aspect of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A shift-by-speech transmission system for a vehicle configured to provide a manual gear selection indicated by a driver's voice command in a dedicated manual-shift mode distinct from an automatic-shifting mode, the shift-by-speech transmission system comprising:
   a microphone configured to pick up the driver's voice command in the dedicated manual-shift mode distinct from the automatic-shifting mode;
   a voice recognition program configured to analyze the driver's voice command for a driver's particular gear selection, wherein the voice recognition program generates an output signal indicating the driver's particular gear selection if the driver's voice command is successfully understood;
   a shift-by-speech transmission control system operatively connected to or containing a manual-shifting mode control logic block operatively connected to a transmission gearbox, wherein the output signal of the voice recognition program to the shift-by-speech transmission control system enables a new gear engagement corresponding to the driver's particular gear selection for the transmission gearbox; and
   a transmission and/or engine protection logic block contained or operatively connected to the shift-by-speech transmission control system, wherein the transmission and/or engine protection logic block prevents a mechanically-detrimental manual gear selection if the driver's particular gear selection initiated by the driver's voice command in the dedicated manual-shift mode exceeds a desired rev-limit or causes potential harm to the vehicle.

2. The shift-by-speech transmission system of claim 1, further comprising an aural indicator logic block, wherein the aural indicator logic block is configured to generate a confirmatory success aural signal if the driver's particular gear selection is successful and a warning aural signal if the driver's particular gear selection cannot be processed.

3. The shift-by-speech transmission system of claim 2, wherein the confirmatory success aural signal is one "beep".

4. The shift-by-speech transmission system of claim 2, wherein the warning aural signal if the driver's particular gear selection cannot be processed is a "beep-beep".

5. The shift-by-speech transmission system of claim 1, further comprising a display unit indicating a current gear selection.

6. The shift-by-speech transmission system of claim 1, further comprising a shift-by-speech on/off switch to enable or disable the manual gear selection indicated by the driver's voice command.

7. The shift-by-speech transmission system of claim 1, wherein the driver's particular gear selection is a simulated gear implemented by a continuously variable transmission (CVT).

8. A method to provide a voice-command manual gear selection for a semi-manual transmission system in a vehicle, the method comprising:
   selecting a manual gearshift mode for the semi-manual transmission system;
   activating a shift-by-speech mode by pressing a shift-by-speech on/off button and then providing a window of time to record a driver's gearshift voice command in a microphone by depressing a gear selection voice command-activating pedal;
   capturing the driver's gearshift voice command indicating a particular gear number with the microphone operatively connected to a voice recognition program for the voice-command manual gear selection;
   comparing the driver's gearshift voice command to a plurality of known voice command profiles in the voice recognition program for the voice-command manual gear selection; and
   if the driver's gearshift voice command matches one of the plurality of known voice command profiles in the voice recognition program for the voice-command manual gear selection:
      checking whether the particular gear number indicated by the driver's gearshift voice command does not result in over-revving or any other mechanical harm to the vehicle; and
      if the particular gear number indicated by the driver's gearshift voice command does not result in over-revving or any other mechanical harm to the vehicle:
         shifting to the particular gear number in the semi-manual transmission system.

9. The method of claim 8, further comprising the steps of generating an aural confirmation if the particular gear number indicated by the driver's gearshift voice command is successfully selected.

10. The method of claim 8, further comprising the steps of generating an aural warning if the particular gear number indicated by the driver's gearshift voice command cannot be processed.

11. The method of claim 8, further comprising the steps of generating a visual sign to indicate a current gear selection.

12. A shift-by-speech transmission system for a vehicle configured to select a gear indicated by a driver's voice command, the shift-by-speech transmission system comprising:
   a microphone configured to pick up the driver's voice command;
   an on/off switch configured to enable or disable a shift-by-speech manual-shifting mode;
   a gear selection voice command-activating pedal configured to provide a window of time to record the driver's voice command in the microphone when the gear selection voice command-activating pedal is depressed;
   a voice recognition program configured to analyze the driver's voice command for a driver's particular gear selection if the shift-by-speech manual-shifting mode is enabled, wherein the voice recognition program generates an output signal indicating the driver's particular gear selection if the driver's voice command is successfully understood; and
   a shift-by-speech transmission control system containing a manual-shifting mode control logic block operatively connected to a transmission gearbox, wherein the output signal of the voice recognition program to the shift-by-speech transmission control system enables choosing the driver's particular gear selection for the transmission gearbox.

13. The shift-by-speech transmission system of claim 12, further comprising a semi-manual gearshift lever with a manual shift mode.

14. The shift-by-speech transmission system of claim 12, further comprising a paddle-shifter attached to a steering wheel unit for manual sequential shifting.

15. The shift-by-speech transmission system of claim 12, further comprising a transmission and/or engine protection logic block operatively connected to the shift-by-speech transmission control system, wherein the transmission and/or engine protection logic block prevents a mechanically-detrimental manual gear selection if the driver's particular gear selection exceeds a desired rev-limit or causes any potential harm to the vehicle.

16. The shift-by-speech transmission system of claim 12, further comprising an aural indicator logic block, wherein the aural indicator logic block is configured to generate a confirmatory success aural signal if the driver's particular gear selection is successful and a warning aural signal if the driver's particular gear selection is unrecognized or rejected.

17. The shift-by-speech transmission system of claim 16, wherein the confirmatory success aural signal is one "beep".

18. The shift-by-speech transmission system of claim 16, wherein the warning aural signal if the driver's particular gear selection cannot be processed is a "beep-beep".

19. The shift-by-speech transmission system of claim 12, further comprising a display unit indicating a current gear selection.

20. The shift-by-speech transmission system of claim 12, wherein the driver's particular gear selection is a simulated gear implemented by a continuously variable transmission (CVT).

* * * * *